United States Patent [19]

Puester

[11] Patent Number: 4,780,379
[45] Date of Patent: Oct. 25, 1988

[54] MULTICELL RECOMBINANT LEAD-ACID BATTERY WITH VIBRATION RESISTANT INTERCELL CONNECTOR

[75] Inventor: Neil Puester, Aurora, Colo.

[73] Assignee: Gates Energy Products, Inc., Gainesville, Fla.

[21] Appl. No.: 106,731

[22] Filed: Oct. 6, 1987

[51] Int. Cl.⁴ .................. H01M 2/24; H01M 2/28
[52] U.S. Cl. ..................... 429/59; 429/160; 429/161; 29/623.2
[58] Field of Search ............. 429/94, 160, 158, 159, 429/161, 59; 29/623.1, 623.2

[56] References Cited

U.S. PATENT DOCUMENTS

| | | | |
|---|---|---|---|
| 3,309,232 | 3/1967 | Wilson | 429/160 |
| 3,579,386 | 5/1971 | Tiegel et al. | 429/160 |
| 3,862,861 | 1/1975 | McClelland | 429/94 |
| 4,241,151 | 12/1980 | Uba | 429/94 |
| 4,346,151 | 8/1982 | Uba et al. | 429/160 |
| 4,383,011 | 5/1983 | McClelland et al. | 429/160 |
| 4,399,607 | 8/1983 | May | 29/623.5 |
| 4,424,264 | 1/1984 | McGuire et al. | 429/179 |
| 4,495,259 | 1/1985 | Uba | 429/161 |
| 4,521,498 | 6/1985 | Juergens | 429/59 |
| 4,592,972 | 6/1986 | Juergens et al. | 429/160 |

FOREIGN PATENT DOCUMENTS

| | | |
|---|---|---|
| 0220062A1 | 1/1984 | European Pat. Off. |
| 56119471 | 2/1983 | Japan . |
| 2061604A | 10/1980 | United Kingdom . |

Primary Examiner—Donald L. Walton
Attorney, Agent, or Firm—C. H. Castleman, Jr.; J. E. Ebel; H. W. Oberg, Jr.

[57] ABSTRACT

A multicell lead-acid battery having a low profile, unitary combination cast-on-strap and intercell connector configured relative to other components of the battery to be resistant to vibrational forces. A method for forming the connector features a heat sealing step to provide a tight mechanical fit.

22 Claims, 7 Drawing Sheets

BEFORE HEAT SEAL

AFTER HEAT SEAL

AFTER HEAT SEAL

AFTER HEAT SEAL

BEFORE ASSEMBLY                AFTER ASSEMBLY

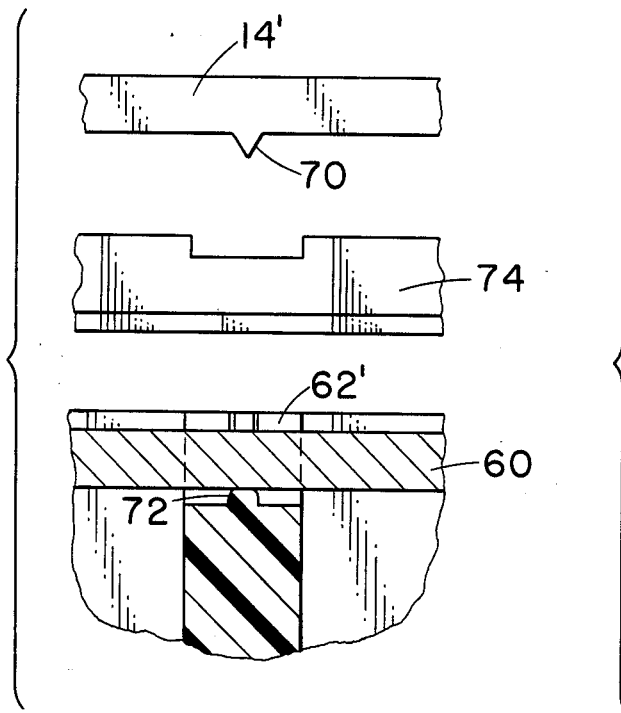
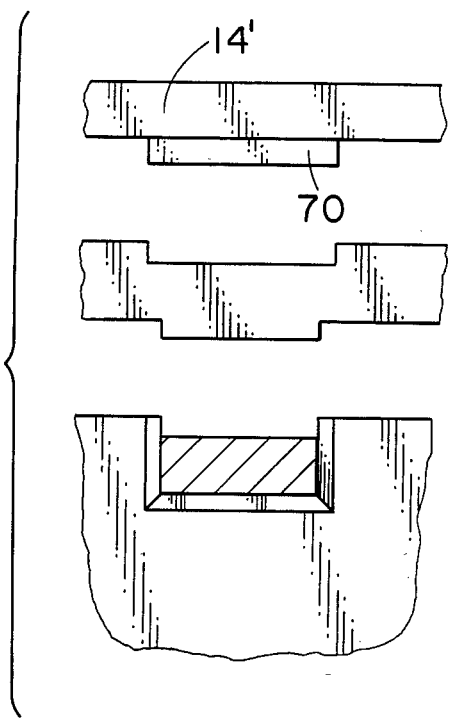
FIG. 9a
FIG. 9b
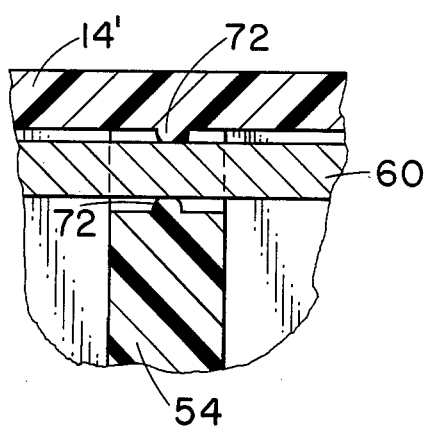
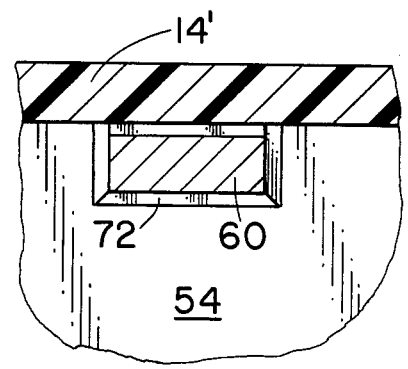
FIG. 9c
FIG. 9d

MULTICELL RECOMBINANT LEAD-ACID BATTERY WITH VIBRATION RESISTANT INTERCELL CONNECTOR

BACKGROUND OF THE INVENTION

This invention relates to multicell sealed lead-acid batteries of the recombinant type and particularly to vibration-resistance intercell connections in recombinant type lead-acid batteries.

Multicell batteries employ intercell connections to series connect the individual cells together to achieve the desired battery voltage. The intercell connections are typically constructed to be leak tight, which prevents electrolyte spillage and electrolyte bridging between cells. Three types of intercell connections used with flooded batteries are external, over-the-wall, and through-the-wall. With the external type, the leads are brought through the individual covers of the cell of each cell via individual sealing means. The intercell connections are made over the individual covers. With the over-the-wall type, the leads are brought up to a notch in the intercell wall and connected. The batteries are then inverted, and lowered onto the cover, which contains a sealing material such as epoxy which seals below the level of the notch. With through-the-wall connections the leads are brought up to a hole in the intercell partition, and welded through the hole to make a sealed connection. Lead-acid batteries of this type typically employ an L-shaped lug burned or cast onto the individual electrode tabs. Examples of vibration-resistant through-the-wall intercell connections in recombinant type lead-acid batteries are found in U.S. Pat. No. 4,495,259 (Uba) and U.S. Pat. No. 4,521,498 (Juergens).

Recombinant batteries, that is lead-acid batteries that rely on oxygen recombination during overcharge to suppress water loss through electrolysis, may employ any of the aforementioned types of intercell connections. However, since recombinant batteries do not have free flowing electrolyte, intercell connections have been proposed which do not make a sealed connection across the intercell partition. U.S. Pat. No. 4,383,011 (McClelland, et al.) illustrates in FIG. 9 thereof a unitary strap and intercell connector which bridges across a cell partition and is contained within the common gas or head space of the battery. Similar intercell connection arrangements are disclosed in U.S. Pat. Nos. 4,399,607 (May) and 4,424,264 (McGuire, et al.). The May patent further discloses a process by which the combination strap and intercell connector are formed, namely by inverting the battery container and forming the combination plate straps and intercell connectors by dipping the plate tabs into mold cavities into which has been introduced molten lead. Recombinant batteries utilizing the aforementioned combination strap/intercell connectors have proved less than satisfactory in applications where significant vibrational forces are present, e.g. in automotive and aircraft applications.

European Application No. 0 220 062 A1 (Morrall) also discloses a combination strap and intercell connector, which passes through an aperture in an associated intercell partition. A U-shaped sealing member engages the intercell partition and the sides and tops of the intercell connector, providing some vibration resistance, however support is confined to the area where the intercell connector passes through the partition. The top of the intercell connector is spaced substantially from the lid of the battery. Japanese Patent Application No. 56-119471 (Jinushi), filed July 29, 1981 discloses a similar unitary strap and intercell connector supported by a U-shaped clip at the partition, and spaced from the undersurface of the lid.

U.K. Patent Application GB No. 2061604 A discloses a combination strap and intercell connector which is formed by casting a metal bar in a mold formed integrally with the intercell partition and being open at its bottom so as to rest directly on the fibrous separator mat extending beyond the electrode plates. The obvious drawback of this construction is that the resultant cast strap/intercell connector will be resting directly on the electrolyte wetted separator, which will lead to a direct electrolyte bridging path between adjacent cells in turn causing local action and self-discharge. Moreover, the close proximity of the underside of the cast strap to the top of the electrode plates can lead to short-circuiting as the positive electrode plates grow during cycling, penetrate the separator layer, and come into contact with the negative polarity portion of the cast strap.

An object of this invention is to provide a vibration-resistant multicell lead-acid battery employing a combination unitary strap and intercell connector providing a low-profile connection for maximum utilization of interior battery compartment space for active materials. It is a further object to provide such a low profile, vibration-resistant construction while inhibiting the formation of intercell electrolyte bridging paths, and the creation of short circuits during cycling. It is a further object to provide the foregoing construction by a simple process lending itself to mechanized assembly techniques.

SUMMARY OF THE INVENTION

Briefly described, in one aspect the invention is directed to a vibration-resistant multicell sealed lead-acid battery of the recombinant type having a monobloc jar container with cell compartments and a closing lid, porous positive and negative electrode plates with protruding tabs positioned in the cell compartments, and porous separator material interleaved between the opposite polarity plates. Electrolyte is absorbed in the plates and separators and present in a starved amount. The cell compartments are separated by intercell partitions having notches at their upper end, the plate tabs of one polarity of a cell being joined to plate tabs of the other polarity of an adjoining cell by a combination strap and intercell connector. The upper surface of the strap/intercell connector is positioned closely adjacent to at least a portion of the underside of the battery lid for vibration support. The lower surface of the strap/intercell connector substantially rests on the notch of the intercell partition and yet is spaced substantially from the plates and separators to inhibit intercell electrolyte bridging as well as short circuits.

In another aspect, the vibration resistance of the combined strap and intercell connector is enhanced by providing an interlock between the connector and intercell partition wall. The interlock can be provided by the battery case or lid melt during a heat sealing operation, resulting in a partial surrounding of the strap material by the plastic of the partition wall or battery lid.

In a further aspect, the invention is directed to a process for forming the combination strap and intercell connector by extending the individual cell packs of separator and plates beyond the compartment edges, inverting such assembly and lowering the protruding plate tabs into a mold so as to cast on the combination strap and intercell connector, pressing the cell packs with the thus welded straps into the bottom of the compartment so that the strap/intercell connectors bottom out against the notches provided in the intercell partitions, and then heat sealing the lid onto the monobloc jar container whereby some battery case melt partially surrounds the strap and provides mechanical support therefor for vibration resistance. Ideally the resultant strap/connectors are positioned closely adjacent to the underside of the lid, also for mechanical support during vibration.

BRIEF DESCRIPTION OF THE DRAWINGS

The invention will be more particularly described in certain of its perferred embodiments in conjunction with the accompanying drawings, in which like numerals designate like parts, and in which:

FIG. 8a illustrates an alternative arrangement similar to FIG. 7a.

FIG. 9a shows an alternative embodiment and relative arrangement of a heat platen with the lid and intercell strap before assembly, shown in side view; FIG. 9b is the same arrangement of parts of FIG. 9a shown in end view; FIG. 9c is the side view arrangement of parts of FIG. 9a after assembly; and FIG. 9d is an end view of the final arrangement of parts of FIG. 9b, after assembly;

PREFERRED EMBODIMENTS OF THE INVENTION

Figure 1:
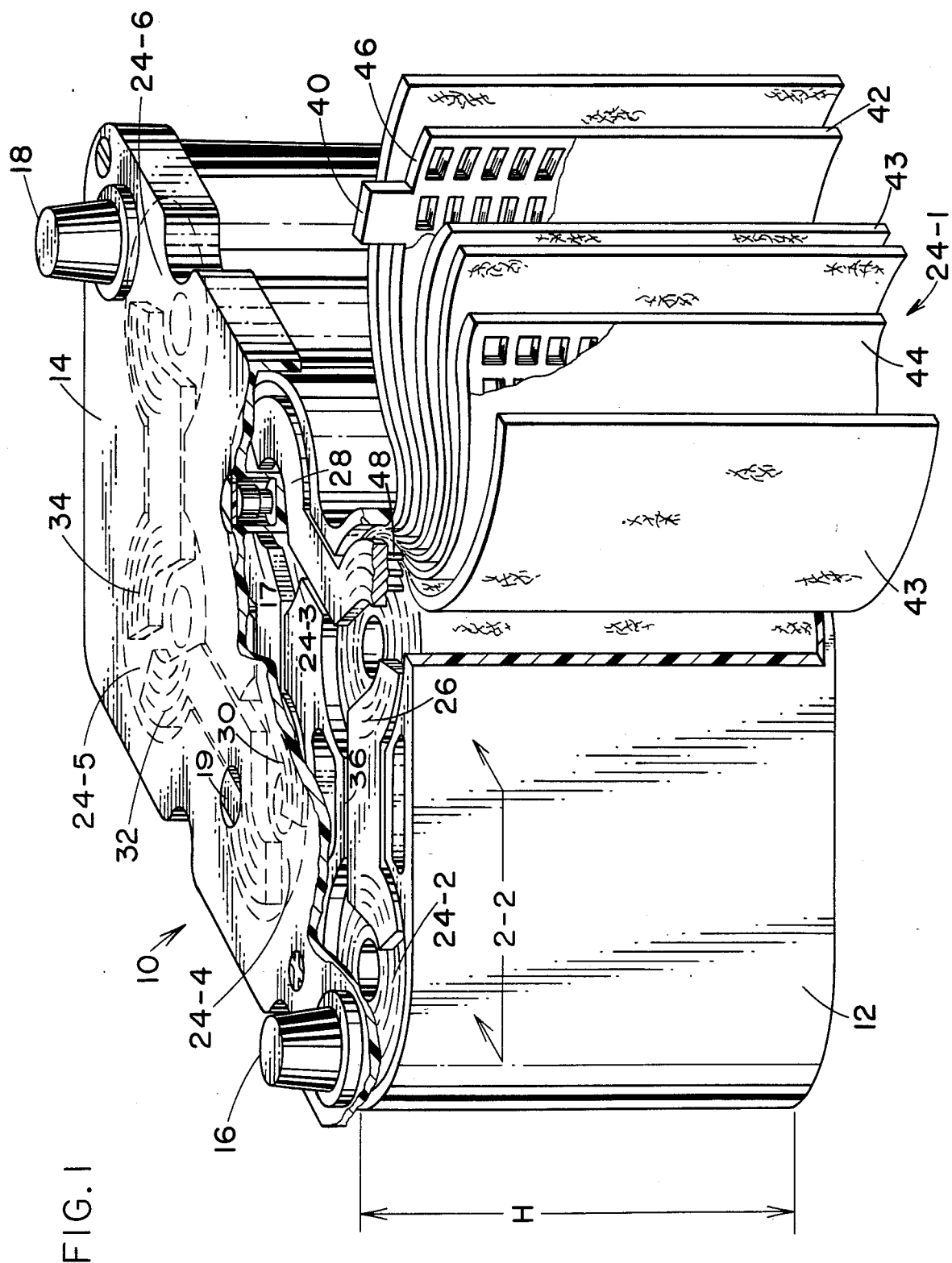
FIG. 1 is a perspective, partial cutaway view of a multicell battery embodying the invention, further showing the components of one cell pack partially unwound to illustrate their relative positioning.
Figure 2:
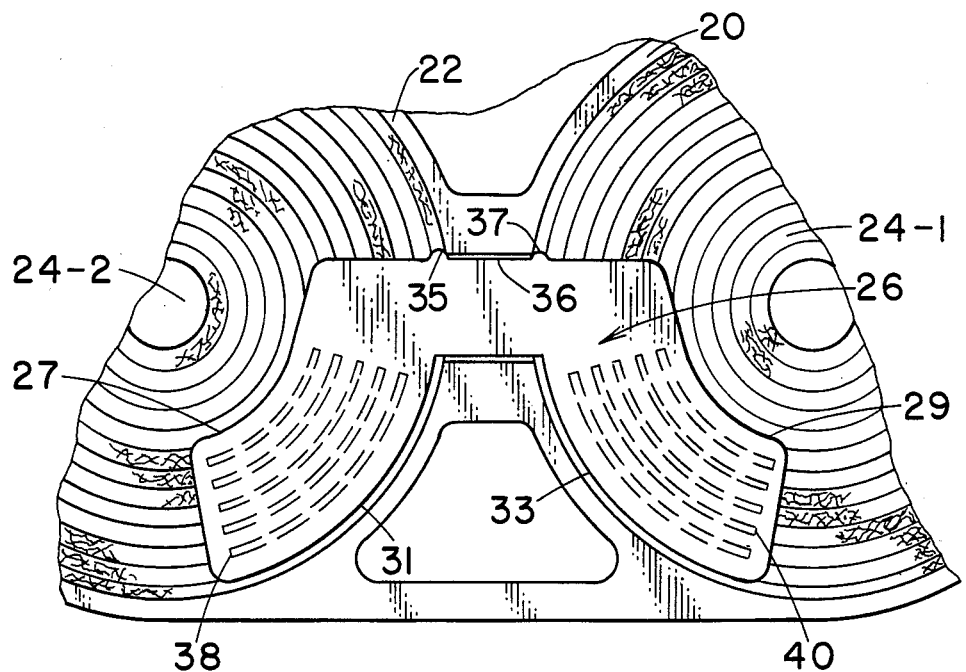
FIG. 2 is a partial top plan view of a portion of the battery of FIG. 1 taken along 2—2 and broken away to illustrate one form of intercell connection in accordance with the invention.

Referring first to the embodiments of FIGS. 1 and 2, there is shown generally at 10, by way of example, a two by three 12 volt cylindrically wound lead-acid automotive battery housed in a monobloc jar container 12, the mouth of which is sealed by lid 14 to produce a gas and electrolyte-tight battery. Standard positive and negative terminals 16, 18 are brought through the lid and positioned at opposite corners of the battery. The lid 14 is preferably provided with one or more safety relief valves 17, 19, of the standard Bunsen type, to reduce excessive pressure that may develop.

Monobloc container 12 is formed of an integral molding or the like containing six cylindrical bores or compartments etc. each housing a spirally wound cell element 24-1, -2, -3, -4, -5, and -6. The cylindrical walls 20, 22 etc. of each of the six cells defining the compartments of the monobloc, which merge together at tangential contact points between the respective cells, are preferably formed of any suitable electrolyte-resistant insulating material of sufficient strength to withstand internal gas pressure and physical impact, such as ABS or polypropylene.

The six cell packs 24-1, -2, -3, -4, -5, and -6 are connected in series by intercell connectors 26, 28, 30, 32, and 34, configured in accordance with the invention. Each of the intercell connectors passes through a notch formed at the upper end of the intercell partition.

As seen best FIG. 2, intercell connector 26 is formed of a unitary combined strap and intercell connector which electrically joins negative plate tabs 38 of cell 24-2 with positive plate tabs 40 of cell 24-1. Connector strap 26 has a low profile and is formed of legs 27, 29, of generally inverted V-shape. Outer surfaces 31, 33 of depending legs 27, 29 respectively, preferably are positioned closely adjacent to their corresponding cylindrical walls 22, 20, thus providing lateral mechanical support and restriction of motion. In this respect, it is also preferred to provide ears 35, 37 which mechanically interlock with cell walls 20, 22 at their juncture at the intercell partition, again for improved vibration resistance.

An outstanding advantage which the combined strap and intercell connector configuration of the invention offers is its low profile connection allowing the introduction of more active electrochemical components into a given cell compartment. The flat design and relative thin section (about 0.100 to about 0.250 inches for the embodiment of FIG. 1) contribute to the low profile. The profile of silhouette is herein defined as the ratio of the headspace i.e. the distance between the cell pack components (generally the separator, since it is extended) and the underside of the lid, illustrated as dimension S in FIG. 4, to the cell height i.e. distance from the bottom of the cell pack to the underside of the lid, shown as dimension H if FIG. 1. In accordance with this invention the ratio of headspace to cell height, S:H, is preferably from about 0.020 to about 0.10, more preferably from about 0.04 to about 0.075.

In general, the battery of FIGS. 1 and 2 offers considerable resistance to vibrational forces also because the indivdual cylindrical wound elements preferably employ compressible separators and the elements themselves fit relatively tightly within each of their respective bores of the monobloc. The individual cell elements are preferably constructed in accordance with the teaching of U.S. Pat. No. 3,862,861. Thus, the materials and arrangement of cell components are chosen to provide a battery capable of discharge and charge (including overcharge) in any attitude without electrolyte loss or significant intracell or intercell migration, and with the ability to recombine oxygen at high rates of efficiency (e.g., above about 99 percent at the C/10-C/20 overcharge rate) while simultaneously achieving relatively high volumetric and gravimetric energy densities.

As in FIG. 1, the cells may be constructed by spirally winding together under tension thin flexible positive plates 42 and thin flexible negative plates 44 with interleaved compressible separators 43 (two layers shown between plates) into a self-supporting roll dimensioned to form a more or less snug fit within each of the bores of the monobloc. The positive and negative plates may be formed respectively of electrochemically active lead and compounds of lead which, upon electroforming, produce positive plates containing lead dioxide as the electrochemically active material, and negative plates having lead in sponge formed as the active material. The plates are formed by pasting grids 46 with such active materials. The grids may be made of cast or wrought lead, for instance formed into a perforated sheet, as shown, or expanded mesh. The lead used for the grid, particularly the negative grid, has a high hydrogen over-voltage and is preferably pure lead of at least about 99.9 percent by weight purity, with the impurities not serving to substantially reduce the hydrogen over-voltage. Alternatively, an alloy of lead naturally having a high hydrogen overvoltage such as lead/-calcium, lead/calcium/tin, or the like may be used. The positive grid may contain low levels of lower hydrogen overvoltage materials, such as antimony at preferably less than 1.5 percent loading. The individual positive grids are provided with a plurality of collector tabs 40, which are radially aligned and joined to the combined strap and intercell connector 26 as shown in FIG. 2. The opposite polarity (negative) collector tabs 48 of cell 24-1 are integrally joined to combined strap and intercell connector 28 for making serial connection with the corresponding positive tabs in cell 24-3. Similar connections are made throughout the battery. All intercell connections in the illustrated embodiment are inverted V-shaped except central connection 30 which is substantially S-shaped.

Alternatively, different combinations of V-, S- and straight cross bar intercell connections may be employed. For example, cells 24-2 and 24-1 could be connected with an S-shaped bar, cells 24-1 and 24-4 with elongated S-bar passing across the open molded channel between cell compartments, cells 24-4 and 24-3 with an S-bar, cells 24-3 and 24-6 with a V-bar, and cells 24-6 and 24-5 with either an S- or V-bar depending upon desired terminal location.

Choice of the separator material 43 is critical to proper operation of the battery in a sealed, recombining mode. The separator has an extremely high absorptivity toward the electrolyte so that it may exert a wicking or capillary effect on the plates, serve to retain the bulk of the electrolyte required to sustain the electrochemical reactions, and provide the battery with a high capacity per unit of weight. Therefore, the separator must also have a high porosity, preferably from about 70 to about 98 and more preferably from about 85 to about 95 percent. In comparison with the plates which have lesser porosities e.g. typically from about 40 to about 60 percent, the separator also has a greater electrolyte absorptive power. Thus, when a prescribed starved amount (less than saturated, preferably substantially less than the amount capable of being absorbed by the plates and separators) of electrolyte is maintained in the battery and becomes tightly absorbed within the plates and separator, the relative greater electrolyte absorptive power of the separator produces an automatic wicking or capillary action whereby the bulk of the electrolyte becomes absorbed in the separator phase. A substantial portion of the pore volume of the plates remains unfilled with electrolyte (voided), more or less uniformly throughout the pore volume of the plates. In this manner, a large portion of the lead particles of the plates, and the pores defined between the particles, are covered by only a thin layer or film of electrolyte thereby producing the well known three-phase boundary condition conducive to gas transport (diffusion in the gas phase) on charge and overcharge.

While the electrolyte is disproportionally distributed in each cell so that preferably at least about 60 percent, more preferably at least about 65 percent, and most preferably at least about 70 percent of the electrolyte is contained within the interstices or pores of the separator, with the remaining amount of electrolyte being preferably absorbed within the pore structure of the plates (there is no free flowing electrolyte in the cell), there still remains some unfilled pore volume within the separator. A low tortuosity direct path is thus available for oxygen evolved at the positive plate on overcharge to pass directly through the separator and into the negative plate where it is consumed at the thin electrolyte layer surfaces there.

Since the porous lead dioxide positive plates (after electroforming) and lead sponge negative plates themselves have a high heat of wetting and absorptive power toward sulfuric acid, the separator material should be chosen to also have a very high heat of wetting and, coupled with this, a large surface area. A high surface area siliceous material is preferred. A separator material which in practice has offered these features is formed of microdiameter glass fibers intermingled to form a sheet or mat. The mat should be compressible so that upon winding or stacking of the elements of the cell, it conforms intimately to the contour to the surface of the plates so that it may perform its wicking or capillary action, as well as providing cushioning for vibration resistance. In general, the plates and separators are held together under firm mutual stacking pressure.

To achieve the high surface area required, the major portion by weight of the high heat of wetting fibers (e.g. glass) have average diameters preferably less than about three microns, more preferably less than about 0.9 microns. Various grades of courser and finer materials may be incorporated with the above-mentioned microdiameter fibers to provide the required tensile strength or other physical properties for ease of manufacture and to improve handling of the mat during assembly. For instance, a typical mat may have from about 75 to about 85 percent by weight of 0.6 micron fiber, from about 5 to about 15 percent by weight of 3 micron fiber, and rovings having diameters from about 7 to about 20 microns in an amount from about 3 to about 10 percent by weight. Utilizing fiber diameters in these preferred ranges, the mats of the invention preferably have surface areas measured by the BET method in the range from about 0.05 to about 20, and more preferably from about 0.1 to about 15 square meters per gram of fiber material.

The electrolyte amount and type are also important in this battery. Liquid sulfuric acid is employed having a specific gravity of preferably at least about 1.27, more preferably at least about 1.30 and more preferably at least about 1.33, while striving to keep this specific gravity below about 1.40 to surpress corrosion. In general, from about 8 to about 11.5 and more preferably from about 8.5 to about 10.5 cc of 1.33 specific gravity sulfuric acid, or equivalent amounts (based on total acid content) of lower density acid, are introduced per ampere hour capacity of each cell.

The foregoing general requirements with respect to the separator and plate materials employed, and electrolyte distribution within those plates and cells apply to the other illustrated embodiments of the invention.

Figure 3:
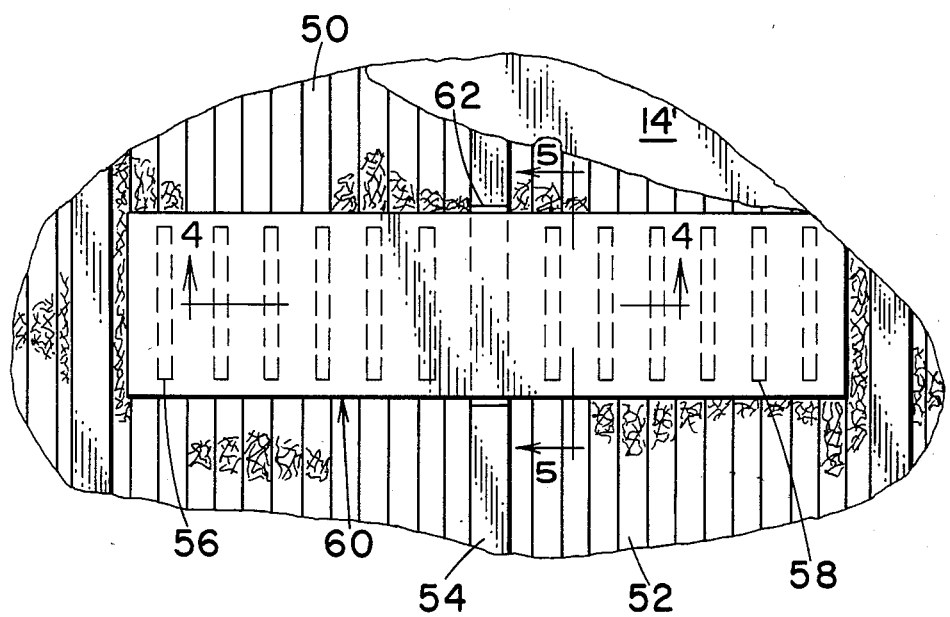
FIG. 3 is a plan view of an alternative strap arrangement for a standard prismatic type battery, partially broken away.

Reference will now be made to the alternative embodiment illustrated in FIGS. 3-5. In this embodiment the plates and separators are stacked in parallel or prismatic fashion in parallelepiped cell compartments separated by intercell partitions 54. A plurality of collector tabs 56 of common polarity in cell 50 are interconnected to a plurality of tabs 58 of opposite polarity in cell 52 with an integral combination strap and intercell connector 60, which passes through a notch 62 formed at the upper end of intercell partition 54.

Figure 4:
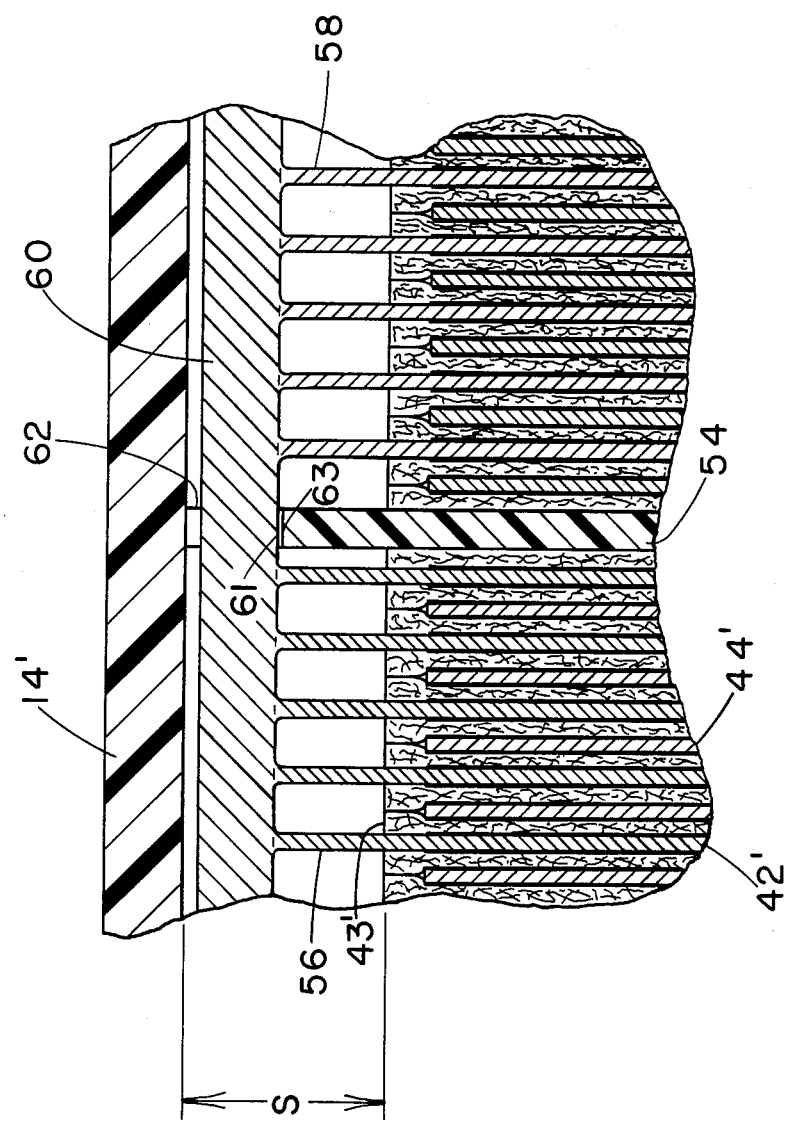
FIG. 4 is an elevational sectional view through the combination strap and intercell connector taken along line 4—4 of FIG. 3.
Figure 5:
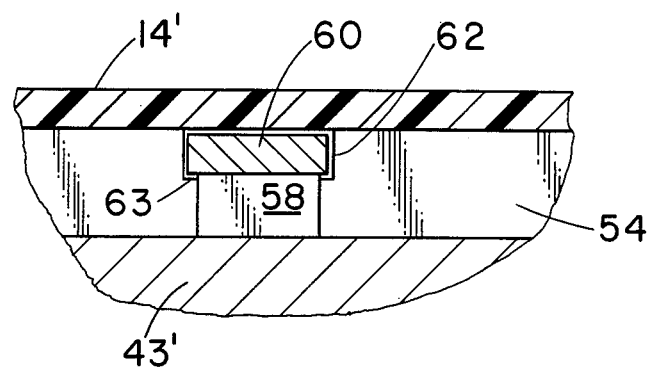
FIG. 5 is a partial sectional view taken along line 5—5 of FIG. 3.

As best seen in FIGS. 4 and 5, the combination strap and intercell connector 60 is preferably positioned in close proximity (defined as including actual contact with) the underside of cover 14'. The battery lid thus serves to closely mechanically constrain strap 60, and limits possible strap excursion when the battery is vibrated in use. In contrast, with some prior battery constructions such as the combined strap and intercell connector taught in the aforementioned European Patent Application No. 0220 062, the strap is held fixedly at the intercell partition and sealed with the use of a U-shaped insert member, which acts as a fulcrum point permiting the strap portion connected to the positive tabs to be displaced upwardly, thereby simultaneously causing the strap connected to the negative tabs in the adjacent cell to be displaced downwardly.

While the upper surface of the strap and intercell connector is positioned closely adjacent to at least a portion of the underside of the battery lid 14' in the preferred embodiment, the lower surface 61 of the connector substantially rests on the notch lower surface 63 of the intercell partition, but is spaced substantially above the plates and separators as shown. This arrangement provides support for the connector while insuring that the formation of intercell electrolyte bridging or creepage paths or short circuits is surpressed.

Figure 6A:
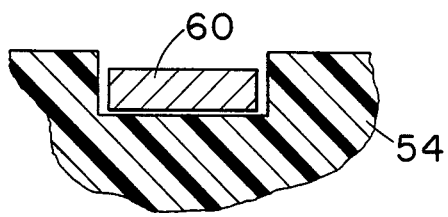
FIG. 6a shows an end sectional view through the interpartition wall showing the arrangement of cast-on-strap and intercell partition before heat sealing the cover.
Figure 6B:
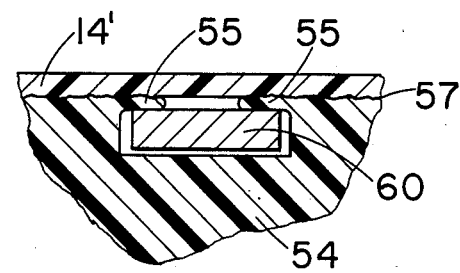
FIG. 6b illustrates the arrangement of FIG. 6a after heat sealing the cover thereon.
Figure 6C:
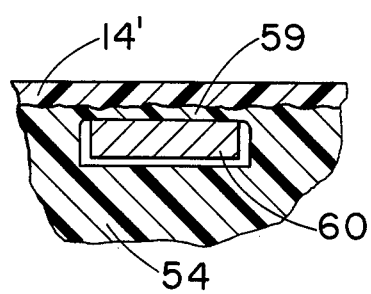
FIG. 6c also shows the arrangement of FIG. 6a after heat sealing in an alternative fashion.

It is preferred that the combination strap and intercell connector fit tightly and preferably interlock with the intercell partition and/or battery lid. One means of obtaining such a tight fit is illustrated in FIGS. 6a-d. In the preferred method for forming the combination strap and intercell connector, whether for spiral wound monobloc batteries of the type shown in FIG. 1 or prismatic batteries of the type shown in FIG. 3, the monobloc container is first inverted and each of the cell packs consisting of plates and separators made to protrude somewhat beyond the individual compartments of the monobloc so that the tabs extend below the container and intercell partition surface. The cell packs are held tight so that they do not fall out of their compartments. The groups of tabs of each cell are then lowered into appropriately shaped molds and lead poured into the molds or dipped into prefilled molds to thereby cast the strap and intercell connector as an integral unit. Once the lead in the mold has solidified the battery is raised again, turned upright, and each of the cell packs driven home in unison (the bottom of the cell packs should contact the bottom of the container) so that the cast-on strap/intercell connector is positioned within the notch of the intercell partition substantially as shown in FIG. 6a. The lid 14' is then preferably heat sealed to the walls and intercell partition 54 (this same procedure applies to heat sealing cover 14 to container walls 12 and cylindrical partitions 20, 22 shown in FIGS. 1 and 2). In normal fashion, a heated platen is placed against both the jar container and lid surfaces to be sealed to soften the same, and the two surfaces brought together under pressure. As is known, some melt and flow may occur at the interface 57 between the lid and intercell partition. This flow is shown at 55 which tends to be squeezed tightly in between strap 60 and cover member 14' which is in close proximity thereto. The amount of battery case material melt and squeeze pressure will control the final amount of flow and, hence, the degree of interlocking of strap 60. It has been found that the flow of material around the strap at 55 further enhances vibration resistance of the connection. By increasing the amount of material melt and/or pressure, a full bridging of melt material on top of the strap as shown at 59 in FIG. 6c results.

Figure 6D:
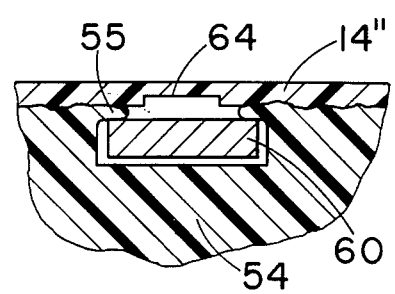
FIG. 6d illustrates an arrangement of parts similar to FIGS. 6b and 6c showing a further alternative.

Alternatively, as shown in FIG. 6d, a gap 64 may be molded into the battery lid 14" so as to allow gas passage between cells, with the benefits more fully taught in U.S. Pat. No. 4,383,011 to McClelland et. al. Obviously, the embodiments shown in FIG. 1, FIG. 4 and FIG. 6b also will permit gas passage between cells since there is no provision for a seal.

Figure 7A:
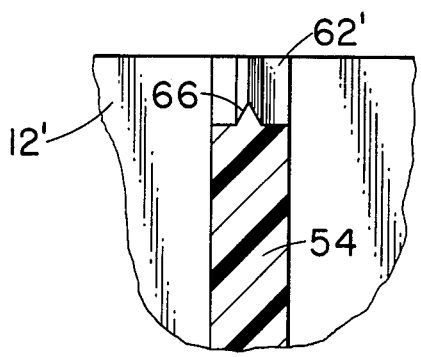
FIG. 7a shows a side sectional view of the intercell partition in one alternative embodiment.
Figure 7B:
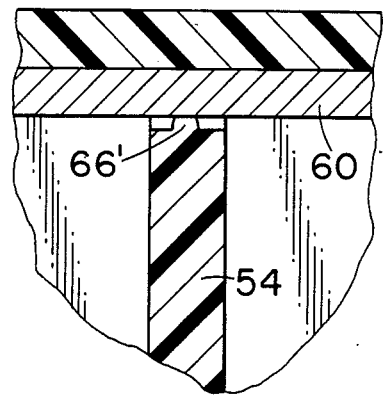
FIG. 7b shows the final through-the-wall connection using the partition of FIG. 7a after installing the combination strap and intercell connector and positioning the lid thereover.
Figure 8A:
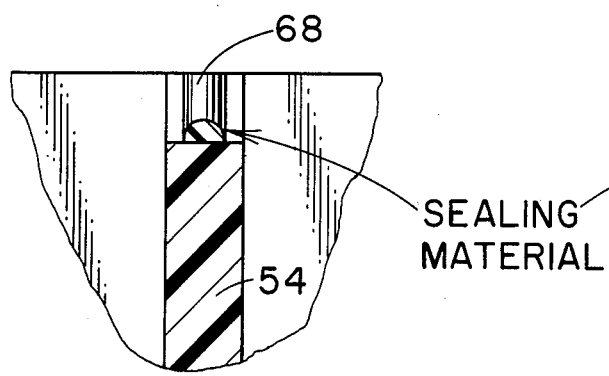
Figure 8B:
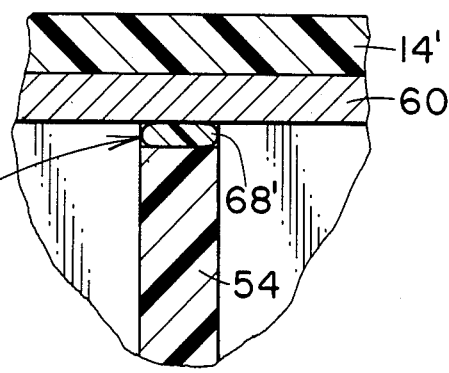
FIG. 8b shows the arrangement of FIG. 8a after assembly similar to FIG. 7b.

On the other hand, if it is desired to seal one cell from another (requiring separate relief valves for each cell), the construction of FIGS. 7a and 7b may be employed. As shown therein, notch 62' is provided along with its three sides with small integral ridges 66 (also formed of thermoplastic material). When a still hot combination cast strap and intercell connector is pressed down against ridges 66, the ridges deform somewhat as shown at 66' and form a seal around the perimeter of the cast-on-strap. An alternative method of obtaining a similar type of seal is shown in FIGS. 8a and 8b wherein an insert of a suitable sealing material, such as hot melt 68, is employed. Either the intercell partition 54 or hot melt compound is preheated immediately prior to inserting strap 60. After assembly the hot melt flattens in sealing engagement as shown at 68'.

A further alternative wherein a seal is effected completely around the perimeter of strap 60 is shown in FIGS. 9a-d. In this embodiment the cover 14' is provided with an integral ridge at 70. Ribs 72 similar to ribs 66 of FIG. 7a are also provided in notch 62' and sealed against the strap/connector in the same manner discussed in reference to FIGS. 7a and 7b. Heated platen 74 is then brought into contact with ridge 70, lid 14' and container 12' and then removed. The lid 14' is then pressed against case 12', effecting a seal between the case and lid. The heated ridges flow and make a seal completely around the cast-on-strap 60 as shown in FIGS. 9c and 9d. In addition to being sealed at the intercell partition opening, the extremities of strap 60 in the adjoining cells are positioned in close proximity to the underside of lid 14', for mechanical support.

Figure 10:
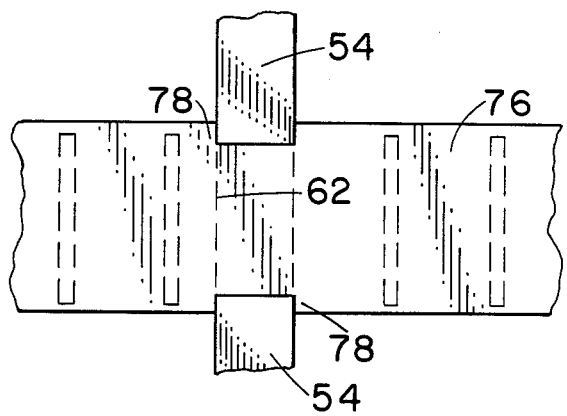
FIG. 10 is a top plan view of an alternative embodiment of the invention.

A further embodiment of the invention is shown in FIG. 10. In this preferred form the cast-on integral strap and intercell connector 76 is configured, similarly to that shown in FIG. 2, to have ears 78 which interlock around the edges of intercell partition 54. This interlocking feature promotes stability of the connection if the battery were to be vibrated.

Figure 11:
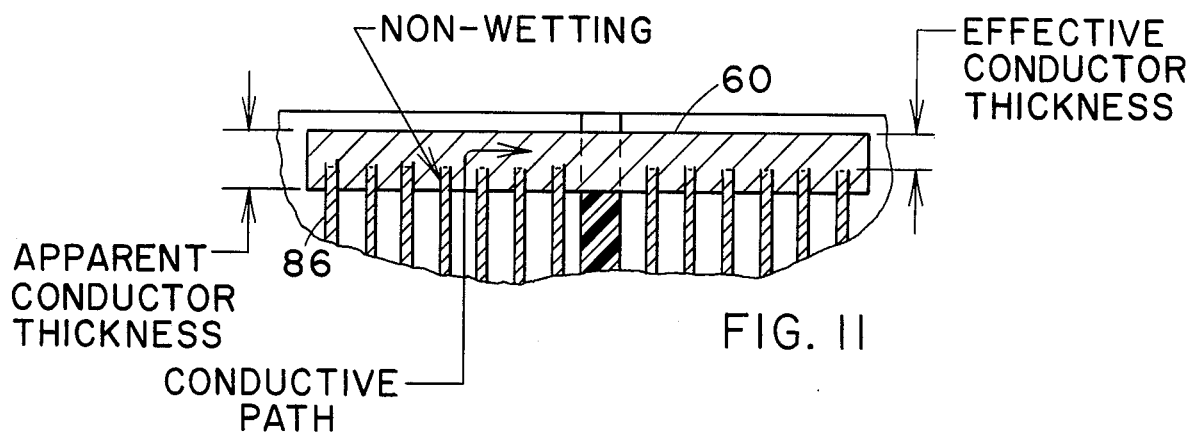
FIG. 11 is an elevational sectional view, enlarged, showing the effective and apparent conductor thicknesses of the combination cast strap and intercell connector of FIG. 3 where poor wetting of tabs results.
Figure 12:
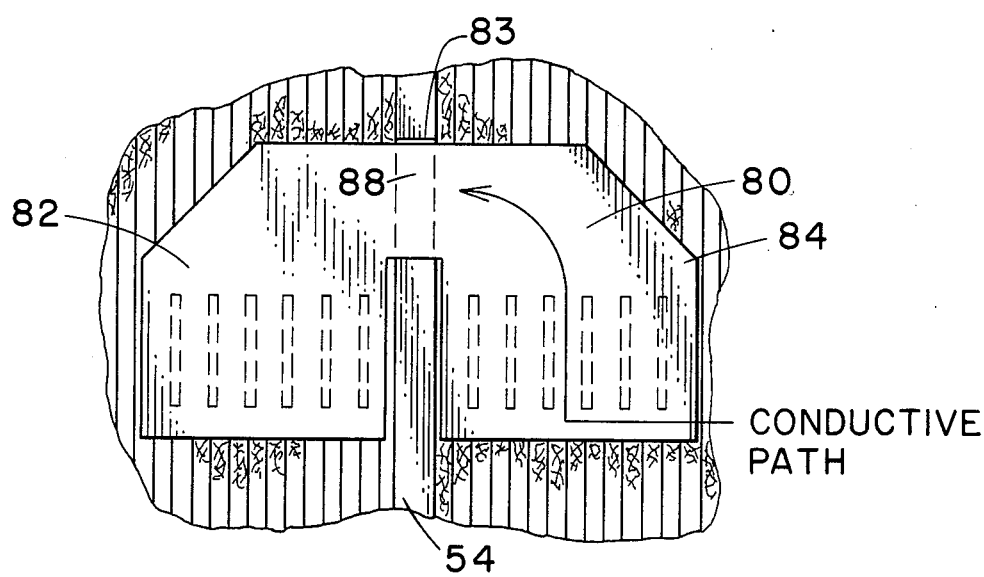
FIG. 12 is a top plan view similar to FIG. 3 showing an alternative, offset combination strap and intercell connector to overcome problems of poor tab wetting.

In FIG. 12 a further embodiment is shown in which the legs 82, 84 of integral strap and intercell connector 80 are offset relative to notch 83 in cell partition 54. This construction has not only the benefits of an interlocking feature, but also that the conductive path has a greater apparent conductor thickness than the standard non-offset construction shown in elevation in FIG. 11. As shown in FIG. 11, typically the tab members 86 do not wet completely during the casting operation resulting in an effective conductor thickness which only extends from the top of strap 60 to the uppermost portion of tabs 86 which have wetted and thus integrated with the remainder of the strap. Since the normal current conductor path is transverse to the width of the tab, the conductor thickness is restricted to the aforementioned effective conductor thickness, substantially less than the apparent thickness of the conductor. Since the effective conductor thickness is dependent upon the height of the wetted tab, the excess conductor material is essentially wasted. With the offset design shown in FIG. 12, the conducting path is more or less parallel to the tab width and then over to the offset intercell connection area shown at 88.

While certain representative embodiments and details have been shown for the purpose of illustrating the invention, it will be apparent to those skilled in this art that various changes and modifications may be made therein without departing from the spirit or scope of the invention.

What is claimed is:

1. A vibration-resistant multicell sealed lead-acid battery of the recombinant type having a monobloc jar container with cell compartments and a lid, porous positive and negative plates with protruding tabs positioned in the cell compartments, porous separator material interleaved between the opposite polarity plates, electrolyte absorbed in the plates and separators and present in a starved amount, the cell compartments being separated by intercell partitions having notches at their upper end, the plate tabs of one polarity of a cell being joined to plate tabs of the other polarity of an adjoining cell by a combination strap and intercell connector whose upper surface is positioned closely adjacent to at least a portion of the underside of the battery lid, and whose lower surface substantially rests on the notch of the intercell partition and yet is spaced substantially from the plates and separators to inhibit the formation of intercell electrolyte bridging paths and short circuits.

2. The lead-acid battery of claim 1 having a low profile wherein the ratio of the distance from the bottom of the lid to the top of the separator, on the one hand, and the distance from the bottom of the lid to the bottom of a cell compartment is from about 0.020 to about 0.1.

3. The lead-acid battery of claim 1 wherein the lid is heat sealed to the container and intercell partition, and melt from the heat seal contacts and partially surrounds the strap and intercell connector.

4. The lead-acid battery of claim 3 wherein the strap and intercell connector is tightly held in the intercell partition.

5. The lead-acid battery of claim 4 wherein the strap and intercell connector is sealed against the intercell partition and lid to prevent gas flow between cells.

6. The lead-acid battery of claim 4 wherein space is maintained between the strap and intercell connector and the intercell partition or lid to provide a gas passageway between adjoining cells.

7. The lead-acid battery of claim 1 wherein the strap and intercell connector mechanically interlock with the intercell partition.

8. The lead-acid battery of claim 1 wherein the strap and intercell connector is laterally offset relative to the notch in the intercell partition.

9. A vibration-resistant multicell sealed lead-acid battery of the recombinant type having monobloc jar container with cell compartments and a lid, porous positive and negative plates with protruding tabs positioned in the cell compartments, porous separator material interleaved between the opposite polarity plates, electrolyte absorbed in the plates and separators and present in a starved amount, the cell compartments being separated by intercell partitions having notches at their upper end, the plate tabs of one polarity of a cell being joined to plate tabs of the other polarity of an adjoining cell by a combination strap and intercell connector which is mechanically interlocked to the lid and/or intercell partition at the notch by virtue of melt from an operation heat sealing the lid to the intercell partition contacting and at least partially surrounding the strap and intercell connector in interlocking relationship.

10. The lead-acid battery of claim 9 having a low profile wherein the ratio of the distance from the bottom of the lid to the top of the separator, on the one hand, and the distance from the bottom of the lid to the bottom of a cell compartment is from about 0.020 to about 0.1.

11. The lead-acid battery of claim 9 wherein the strap and intercell connector is sealed against the intercell partition and lid to prevent gas flow between cells.

12. The lead-acid battery of claim 9 wherein space is maintained between the strap and intercell connector and the intercell partition or lid to provide a gas passageway between adjoining cells.

13. The lead-acid battery of claim 9 wherein the strap and intercell connector is laterally offset relative to the notch in the intercell partition.

14. The lead-acid battery of claim 9 wherein the interlock is made directly between the strap and intercell connector, and lid and/or intercell partition melt, without any other intervening material.

15. A vibration-resistant multicell sealed lead-acid battery of the recombinant type having a monobloc jar container with cylindricla cell compartments and a lid, porous positive and negative plates spirally wound together with protruding tabs positioned in the cell compartments, porous separator material interleaved between the opposite polarity plates, electrolyte absorbed in the plates and separators and present in a starved amount, the cell compartments being separated by intercell partitions having notches at their upper end, the plate tabs of one polarity of a cell being joined to plate tabs of the other polarity of an adjoining cell by a combination strap and intercell connector having a generally inverted V-shaped with a pair of depending legs respectively joined to opposite polarity tabs and offset relative to the notch in the intercell partition, and the strap and intercell connector having an upper surface which is positioned closely adjacent to at least a portion of the underside of the lid.

16. The lead-acid battery of claim 15 wherein the combination strap and intercell connector is formed by the cast-on-strap process.

17. The lead-acid battery of claim 15 wherein the ratio of the distance from the bottom of the lid to the top of the separator, on the one hand, and the distance from the bottom of the lid to the bottom of a cell compartment is from about 0.020 to about 0.1

18. The lead-acid battery of claim 15 wherein space is maintained between the strap and intercell connector and the intercell partition or lid to provide a gas passageway between adjoining cells.

19. The lead-acid battery of claim 15 wherein the strap and intercell connector mechanically interlock with the intercell partition.

20. A process for producing a vibration-resistant multicell lead-acid battery, comprising:
   a. forming a plurality of cell packs comprising porous positive and negative plates and interleaved separators, the plates having tabs protruding fom an edge of the cell pack;
   b. positioning the cell packs within open cell compartments of a thermoplastic monobloc container so that the tabs protrude beyond the edge of the open end of the cell compartments;
   c. inverting the container and maintaining the tabs in protruding relation to the edge of the open end of the cell compartments;
   d. immersing the tabs in molten lead contained within a mold to form a combination unitary cast-on-strap and intercell connector interconnecting tabs of one polarity of a cell to tabs of the other polarity of an adjoining cell across and intercell partition;
   e. pressing the cell packs with combination cast-on-straps and intercell connectors to the bottom of the cell compartments at their closed end; and
   f. heat sealing a lid to the intercell partition(s) so that the lid and intercell partition partially melt, and the resultant melt is squeezed to cause it to contact and flow around, and solidify against, the unitary cast-on-strap and intercell connector.

21. A vibration-resistant multicell sealed lead-acid battery of the recombinant type having a monobloc jar container with cylindrical cell compartments and a lid, porous positive and negative plates spirally wound together with protruding tabs positioned in the cell compartments, porous separator material interleaved between the oppositive polarity plates, electrolyte absorbed in the plates and separators and present in a starved amount, the cell compartment being separated by intercell patitions having notches at their upper end, the plate tabs of one polarity of a cell being joined to plate tabs of the other polarity of an adjoining cell by a combination strap and intercell connector having a generally inverted V-shape with a pair of depending legs respectively joined to opposite polarity tabs and offset relative to the notch in the intercell partition, the lid being heat sealed to the container and intercell partition, with the melt from the heat seal contacting and partially surrounding the strap and intercell connector.

22. The process the claim 20 wherein the resultant melt fully bridges the space formed between the lid and the combination unitary cast-on strap and intercell connector.

* * * * *